July 18, 1939.  E. G. LLOYD  2,166,215

METHOD OF AND MEANS FOR FORMING UNBREAKABLE LENSES

Filed Dec. 28, 1936

Inventor.
Ernest G. Lloyd.

Attorney.

Patented July 18, 1939

2,166,215

UNITED STATES PATENT OFFICE 2,166,215

METHOD OF AND MEANS FOR FORMING UNBREAKABLE LENSES

Ernest G. Lloyd, Los Angeles, Calif.

Application December 28, 1936, Serial No. 117,858

10 Claims. (Cl. 18—19)

This invention relates generally to eyeglass or spectacle lenses, and more particularly to formation of such lenses from non-breakable material.

The general object of the present invention is to provide unbreakable eyeglass lenses, while a more particular object is to provide a method of and means for forming true dioptric curves on opposite surfaces of a suitable transparent, plastic material, which is substantially unbreakable when shaped in eyeglass lens form.

In accordance with the present invention, the lenses are formed from blanks of a transparent plastic material, capable of being shaped under heat and pressure. I have found that an organic resin, a typical form of which is commercially available under the trade name Plexiglas, and which is in substance a polymerized derivative of acrylic acid, is particularly well adapted to the purpose of the present invention, having the physical and optical characteristics desired in a spectacle lens of the character wanted, as well as being capable of being worked or formed in accordance with the method of the present invention.

The specific material named, when formed into a piece of the thickness of an ordinary eyeglass lens, is for all practical purposes entirely unbreakable. It is highly transparent, its light transmission being nearly 95%. The index of refraction of the material is 1.4975, thus differing but little from the index for optical glass. The material becomes sufficiently plastic to be worked or bent at approximately 90° C.

In forming a spectacle lens from this material in accordance with my improved and preferred technique, I first prepare a pair of dies, ground and figured with dioptric surfaces, which are identical, except for being of reverse curvatures, to those wanted on opposite sides of the finished lens. These dies must be of a material which is both hard and capable of being given an optically smooth dioptric surface, and I have found that dies formed of glass are suitable to the process. If material other than glass is used for these dies, as for instance an alloy such as stellite, its hardness must be equal to or greater than 68 on the Rockwell "C" scale in order to insure good results.

In calculating the curvatures of these surfaces, suitable account is of course taken of the fact that the refractive index of the material to be utilized differs slightly from that of glass. These dioptric surfaces are thus ground on opposing surfaces of a pair of dies, typically of glass, or other suitable material, and this grinding operation may be done in the same general manner in which conventional eyeglass lenses are ground.

Having the two dies, formed of glass or other material of like characteristics, a sheet or "blank" of the material of which the lens is to be formed is placed therebetween, and the dies and material are then gradually heated up to from say 300° to 350° F. At the same time pressure is applied to the dies, which gradually increases as the temperature rises. As the temperature of the material reaches approximately 300° F., the material becomes plastic and is formed, under the pressure exerted, to the curvatures of the dioptric surfaces on the dies. The pressure is then sustained, or preferably somewhat increased, while the temperature of the material is gradually decreased to approximately 100° F. At this time the pressure may be released and the lens removed from between the dies. Finally, after being taken from the dies, the lens is preferably hardened by suddenly cooling it to say —100° F. by placing it in an atmosphere of a very cold inert gas. This may easily be done by placing the lens in the gas rising from solid carbon dioxide. Any other cooled inert gas, as nitrogen, helium, argon, krypton, or neon, might be used in this step. The curvatures of the dies are transferred prefectly to the lens, which comes out with optically smooth surfaces, and which is free from internal stresses which might otherwise tend subsequently to deform the lens.

The invention will be better understood by referring now to the following detailed description thereof, reference being made to the accompanying drawing, in which.

Figures 1, 2, 3, 4, 5, 6, 7:
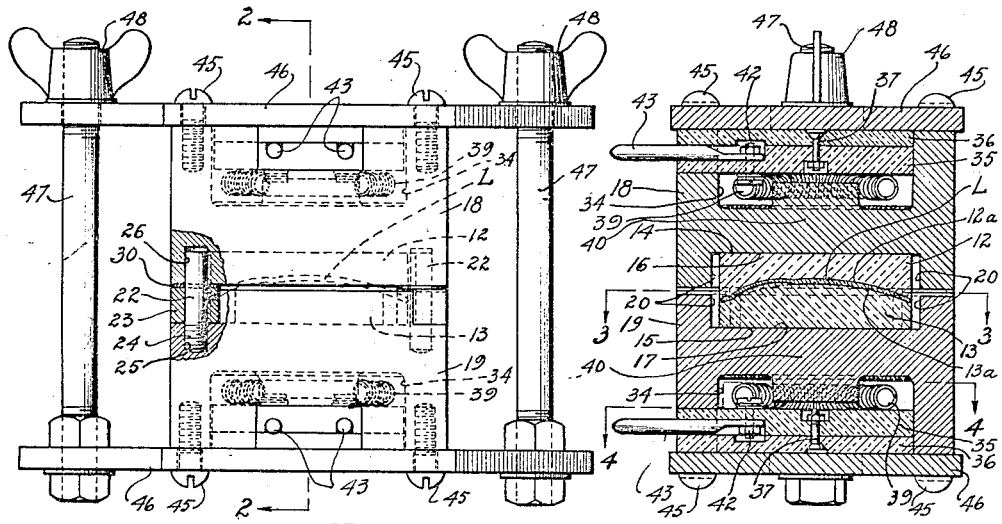
Fig. 1 is a side elevation of a pair of die holders in accordance with the present invention.
Fig. 2 is a section taken on line 2—2 of Fig. 1.
Fig. 3 is a view taken on line 3—3 of Fig. 2.
Fig. 4 is a section taken on line 4—4 of Fig. 2.
Fig. 5 is an elevation of a finished lens.
Fig. 6 is a section on line 6—6 of Fig. 5.
Fig. 7 is a diagram showing the relation between heat and pressure during forming of the lens.

In accordance with the preferred practice of my invention, the lens is formed between two die members 12 and 13, preferably of glass or similar hard smooth surfaced material which can be formed with optically perfect dioptric curves. Whether of glass or other material, the hardness of these dies should equal substantially 68 or greater on the Rockwell "C" scale to insure good results. As here shown, these dies 12 and 13 are square in outline, though this is of course not essential. Opposing surfaces 12a and 13a of the two dies are ground with the dioptric surfaces which are desired to be imparted to the surfaces of the lens to be formed, and this may be done by any well known grinding method such as is ordinarily used in grinding an ordinary glass lens. Each die block is made from a block of uniform thickness, which may typically be one half inch. One block is hollowed out, or given a concave shape, and the edge thickness of this block remains substantially one half inch. The other block is ground down at the edges, or given a convex shape, and the center thickness of this block remains substantially one half inch. This holds true regardless of the specific curvatures given to the ground surfaces. Thus, for all curvatures, the sum of the edge thickness dimension of one die and the center thickness dimension of the other die is a constant.

The flat outer surfaces 14 and 15 of dies 12 and 13 are backed up and supported by flat surfaces 16 and 17, respectively, of a pair of die holders 18 and 19.

As here shown, die holders 18 and 19 comprise metal, heat conductive blocks provided in their adjacent sides with square registering recesses 20, which are defined at the bottom by the aforementioned die engaging surfaces 16 and 17. Flange 21 around recess 20 in lower die holder 19 is cut away at the corners to provide for dowel pins 22 and perforated spacers 23 slidable on said dowels. For instance, as shown best in Fig. 1, each dowel pin 22 is screw-threaded at one end as at 24, and is screwed into a screw-threaded socket 25 in one die holder, while the other die holder is provided with a bore 26 adapted to receive and slide down over dowel pin 22 as the die holders are moved together. One dowel pin is provided at each corner of the die holders, and the set of four dowel pins accurately guide the die holders to move toward one another in perfect alignment.

Spacers 23 are of such thickness that if there were no lens material between the dies, so that curved die surfaces 12a and 13a might contact one another, then upon movement of the die holders together, the flange 21 of the upper die would engage the upper ends of said spacers simultaneously with engagement of upper die surface 14 by die holder surface 16. The die holders would then be in their extreme closed position, with no spacing provided for the lens. To establish the thickness of the lens to be formed, and to arrest movement of the die holders toward one another when the lens has been pressed to the thickness wanted, washers 30 of the exact lens thickness desired are placed on dowel pins 26 over spacers 23. Accordingly, assuming a lens blank of plastic lens material to be placed between the dies, the dies are pressed together until upper die holder 18 engages the upper surface of washers 30, thereby assuring that the lens L formed between the dies will be pressed to the exact thickness wanted. As shown in the drawing, a space is provided between the sides of the dies 12 and 13 and the inner surfaces of the flanges 21 of the die holders.

The outer end of each die holder block is recessed, as at 34, to receive a pair of insulation plates 35 and 36, secured together as by screw 37. Inner plate 35 supports an electric heating coil element 39 in comparatively close heating relation to the die holder wall portion 40 separating die receiving chamber 20 from heating coil recess 34, said coil 39 radiating heat to wall portion 40 to be conducted to the die within chamber 20. The ends of heating coil 39 are connected to terminal screws 42, which are in turn connected to connector pins 43 projecting from the side of the die holder between insulation plates 35 and 36, in the manner clearly illustrated in the drawings. These pins 43 are adapted to be plugged into a conventional electric socket supplied with a suitable source of electric current, as will be understood.

Secured to the outer ends of die holders 18 and 19, as by screws 45, are plates 46 which are connected by screws 47 and nuts 48. These screws simply hold the die holders in assembly, pressure being placed on the material between the dies by pressing inwardly on plates 46, which is done in any suitable press, not necessary here to illustrate.

Assuming that the proper die blocks, of glass or other suitable material, have been provided and are in place in the die holders, with a lens blank of the plastic lens material therebetween, this blank being of a size slightly larger all around than the dimensions of the final lens, and being of uniform thickness and preferably, though not necessarily, initially substantially flat, the procedure of forming the lens is as follows: Connection is made between the two pairs of connector pins 43 and suitable electric supply current connector sockets, causing current to flow through heating coils 39, whereupon die holders 18 and 19 and dies 12 and 13 gradually rise in temperature.

When the temperature of the dies has increased to approximately 300° F., or slightly higher, the lens blank between the dies is sufficiently plastic to be formed by the dies. As the temperature increases and reaches the value at which the material becomes plastic, pressure is gradually applied to the die holders by means of any suitable press, not shown. The temperature and pressure variations with time are approximately plotted in the graph of Fig. 7. It will be seen from this graph that the temperature of the material is raised from room temperature to approximately 300° F. (at which point the material is somewhat plastic) in approximately two minutes, and reaches its maximum temperature, approximately 350° F., in about five minutes from starting time. At this time the electric heating current is disconnected and the dies and holders allowed to cool for approximately ten minutes, or until the temperature of the material has returned to approximately 100° F. The die holders are electrically heated as described within a suitable press, not shown, and during the heating process are subjected to pressure in accordance with the pressure curve of the graph of Fig. 7. As shown, until the temperature is sufficient to render the material plastic in character, the pressure is kept comparatively low, being necessarily only sufficient to hold the parts in position. As the material reaches plastic temperature, however, the pressure is quickly increased to a comparatively high value, for instance to a pressure of the order of 1,000 pounds per square inch.

Under this pressure the dies are pressed toward one another and bend and form the plastic lens material into the exact shape and form of the dioptric surfaces which have previously been ground thereon. The pressure at this time may be sufficient to bring the upper die holder into engagement with spacer washers 30, and in this event such pressure is sustained during cooling of the material. Since the blank of thermoplastic originally inserted between the dies was thicker than the final lens desired, the movement of the dies toward each other and the pressure thus generated causes the plastic to flow outwardly between the die surfaces. Alternatively, the pressure during this period of highest heat may be sufficient to transfer the dioptric curves on the dies to opposite sides of the lens, but not quite such as to bring the upper die holder into engagement with spacer washers 30. In the latter event, the pressure on the die holders is still further increased while the lens is cooling. This latter procedure appears to have an effect beneficial to the perfection of the lens. The sustained or increased pressure during the cooling period sets the lens in the shape wanted and insures that when cooled and removed from between the dies, it will retain the exact shape which it was caused to assume while in a heated, plastic condition within the dies.

After being removed from the dies, the lens is preferably further hardened by sudden cooling. This is done in accordance with my invention by immersing the lens immediately that it is taken from the dies, at a temperature around 100° F. into a bath of very cold inert gas, thereby suddenly chilling the lens to a temperature of about 100° F. For instance, the lens may be placed in an atmosphere of carbon dioxide gas evaporating from solid carbon dioxide. Any other cooled inert gas may be used for this purpose. Lenses made in the manner described are found to possess a surface which is harder than that of the original resin, particularly if the pressed lens is quickly chilled.

The cooled lens after subjection to this treatment is entirely free from internal stresses such as might subsequently cause the lens to warp. The surfaces of the lens are optically true and smooth, and insofar as optical characteristics are concerned, the lens compares with a well ground glass lens. As previously stated, the lens is for all practical purposes entirely unbreakable. It is non-plastic at all ordinary temperatures, and when made of the specific material named above is free from discoloration or warping.

The process lends itself to production of bi-focal as well as conventional lenses. In making a bi-focal lens, dies are used with the bi-focal curves established as desired, and such bi-focal surfaces are pressed in one operation on the lens blanks without any further alteration in the process. The lens illustrated in Figs. 5 and 6 and the dies shown in Fig. 2, are of bi-focal type, as will be apparent from an inspection of those figures.

It is to be understood that the disclosure of my invention as given above is simply illustrative and not limitative on my broad invention, and that various changes and modifications may be made without departing from the spirit and scope of my invention or of the appended claims.

I claim:

1. A method of forming spectacle lenses which have a desired focal length, from an organic thermo-plastic material, which comprises: placing a solid blank of organic transparent thermo-plastic material of greater thickness than that desired in the finished lens between surfaces of opposing dies, said surfaces comprising the reverse of substantially optically perfect dioptric curves desired in the finished lens, said dies being so formed as to permit excess thermo-plastic material to flow out from between said dies; heating the dies and thermo-plastic material to a temperature at which the material becomes sufficiently plastic to flow only under pressure; moving one of said dies toward the other to press the thermo-plastic material with sufficient pressure to cause the material to conform to the contours of the die surfaces and to flow outwardly between the die surfaces; stopping the movement of the dies toward each other to obtain a lens of desired thickness and cooling the dies and material to a temperature below that at which it can be bent and worked while maintaining a pressure on the material, and then removing the formed material from between the dies.

2. A method of forming spectacle lens which have a desired focal length, from an organic, transparent thermo-plastic resin, which comprises: placing a solid blank of organic, transparent thermo-plastic resin of greater thickness than that desired in the finished lens between surfaces of opposing dies, said surfaces comprising the reverse of substantially optically perfect dioptric curves desired in the finished lens, said dies being so formed as to permit excess thermo-plastic resin to flow out from between said dies; heating the dies and thermo-plastic resin to a temperature at which the resin becomes sufficiently plastic to flow only under pressure, moving one of said dies toward the other to press the thermo-plastic resin with sufficient pressure to cause the resin to conform to the contours of the die surfaces and to flow outwardly between the die surfaces; stopping the movement of the dies toward each other to obtain a lens of desired thickness and cooling the dies and resin to a temperature below that at which it can be bent and worked while maintaining a pressure on the resin, and then removing the formed resin from between the dies.

3. A method of forming spectacle lenses which have a desired focal length, from an organic thermo-plastic material, which comprises: placing a solid blank of organic, transparent thermo-plastic material composed of polymerized derivatives of acrylic acid of greater thickness than that desired in the finished lens between surfaces of opposing dies, said surfaces comprising the reverse of substantially optically perfect dioptric curves in the finished lens, one of said surfaces including bi-focal dioptric curves, said dies being so formed as to permit excess thermo-plastic material to flow out from between said dies; heating the dies and thermo-plastic material to a temperature at which the material becomes sufficiently plastic to flow only under pressure but not in excess of about 350° F., moving one of said dies toward the other to press the thermo-plastic material with sufficient pressure to cause the material to conform to the contours of the die surfaces and to flow outwardly between the die surfaces; stopping the movement of the dies toward each other to obtain a lens of desired thickness and cooling the dies and material to a temperature below that at which it can be bent and worked while maintaining a pressure on the material, and then removing the formed material from between the dies.

4. A method of forming spectacle lenses which have a desired focal length, from an organic thermo-plastic material, which comprises: placing a solid blank of organic, transparent thermo-plastic material of greater thickness than that desired in the finished lens between surfaces of opposing dies, said surfaces being highly polished and of a hardness of at least about 68 on a Rockwell C scale, and comprising the reverse of substantially optically perfect dioptric curves desired in the finished lens, heating the dies and thermo-plastic material to a temperature at which the material becomes sufficiently plastic to flow only under pressure; moving one of said dies toward the other to press the thermo-plastic material with sufficient pressure to cause the material to conform to the contours of the die surfaces and to flow outwardly between the die surfaces; stopping the movement of the dies toward each other to obtain a lens of desired thickness and cooling the dies and material to a temperature below that at which it can be bent and worked while maintaining a pressure on the material, and then removing the formed material from between the dies.

5. A method of forming spectacle lenses which have a desired focal length, from an organic thermo-plastic material, which comprises: placing a solid blank of organic, transparent thermoplastic material composed of polymerized derivatives of acrylic acid of greater thickness than that desired in the finished lens between surfaces of opposing dies, said surfaces being highly polished and of a hardness of at least about 68 of a Rockwell C scale, and comprising the reverse of substantially optically perfect dioptric curves desired in the finished lens, one of said surfaces including bi-focal dioptric curves, said dies being so formed as to permit excess thermo-plastic material to flow out from between said dies; heating the dies and thermo-plastic material to a temperature at which the material becomes sufficiently plastic to flow only under pressure but not in excess of about 350° F.; moving one of said dies toward the other to press the thermo-plastic material with sufficient pressure to cause the material to conform to the contours of the die surfaces and to flow outwardly between the die surfaces; stopping the movement of the dies toward each other to obtain a lens of desired thickness and cooling the dies and material to a temperature below that at which it can be bent and worked while maintaining a pressure on the material, and then removing the formed material from between the dies.

6. A method of forming spectacle lenses having a desired focal length from organic thermo-plastic material which comprises: placing a solid blank of organic, transparent thermo-plastic material of greater thickness than that desired in the finished lens between surfaces of opposing dies, said surfaces comprising the reverse of substantially optically perfect dioptric curves desired in the finished lens, said dies being so formed as to permit excess thermo-plastic material to flow out from between said dies, heating the dies and thermo-plastic material to a temperature at which the material becomes sufficiently plastic to flow only under pressure, moving one of said dies toward the other to press the thermo-plastic material with sufficient pressure to cause the material to conform to the contours of the die surfaces and to flow outwardly between the die surfaces, cooling the dies and material to a temperature below that at which it can be worked while continuing to move the dies toward each other and finally stopping the movement of the dies to obtain a lens of desired thickness.

7. A method of forming spectacle lenses and the like which have a desired focal length, from an organic thermo-plastic material, which comprises: placing a solid blank of organic, transparent thermo-plastic materal composed of polymerized derivatives of acrylic acid of greater thickness than that desired in the finished lens between surfaces of opposing dies, said surfaces being highly polished, of a hardness of at least about 68 on a Rockwell C scale and comprising the reverse of substantially optically perfect dioptric curves desired in the finished lens, one of said surfaces including bi-focal dioptric curves, said dies being so formed as to permit excess thermo-plastic material to flow out from between said dies; heating the dies and thermo-plastic material to a temperature at which the material becomes sufficiently plastic to flow only under pressure but not in excess of about 350° F.; moving one of said dies toward the other to press the thermoplastic material with sufficient pressure to cause the material to conform to the contours of the die surfaces and to flow outwardly between the die surfaces; stopping the movement of the dies towards each other to obtain a lens of desired thickness and cooling the dies and the material to a temperature below that at which it can be bent and worked while maintaining the pressure on the material and then removing the formed material from between the dies and subjecting it to the action of a cold inert gas.

8. A method of forming spectacle lenses and the like which have a desired focal length, from organic thermoplastic material, which comprises: placing a solid blank of organic transparent thermo-plastic material of greater thickness than that desired in the finished lens between surfaces of opposing dies, said surfaces comprising the reverse of substantially optical perfect dioptric curves desired in the finished lens, one of said surfaces including bi-focal dioptric curves, said dies being so formed as to permit excess thermoplastic material to flow out from between said dies; heating the dies and thermo-plastic material to a temperature at which the material becomes sufficiently plastic to flow only under pressure; moving one of said dies toward the other to press the thermo-plastic material with sufficient pressure to cause the material to conform to the contours of the die surfaces and to flow outwardly between the die surfaces; stopping the movement of the dies toward each other to obtain a lens of desired thickness and cooling the dies and material to a temperature below that at which it can be bent and worked while maintaining a pressure on the material, and then removing the formed material from between the dies.

9. In a machine for forming spectacle lenses and the like from organic thermo-plastic materials the combination of: a pair of die holders movable toward and away from each other; a pair of dies, each provided with a highly polished surface carrying a dioptric curve reverse of that desired on the finished lens, said dies being removably held by the die holders with the curved surfaces in opposing relation and adapted to act upon the thermo-plastic material inserted therebetween, said dies being smaller than said holders to form a space around the sides of said dies, and removable stop means between said die holders and spaced from the sides of the dies for limiting the movement of the dies and holders toward one another.

10. In a machine for forming spectacle lenses and the like from organic thermo-plastic materials, the combination of: a pair of die holders movable toward and away from each other, each die holder including an upstanding flange; a pair of dies, each provided with a highly polished surface carrying a dioptric curve reverse to that desired on the finished lens, each of said dies being removably held within the upstanding flange of one of said die holders but having its sides spaced from the flange; and removable stop means between opposing flanges of said die holders and spaced from the sides of the dies for limiting the movement of the dies and holders toward one another.

ERNEST G. LLOYD.